(12) United States Patent
Schwarz et al.

(10) Patent No.: US 9,051,897 B2
(45) Date of Patent: Jun. 9, 2015

(54) SYSTEM FOR OPTIMIZING POWER USAGE FROM DAMAGED FAN BLADES

(75) Inventors: Frederick M. Schwarz, Glastonbury, CT (US); Coy Bruce Wood, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 823 days.

(21) Appl. No.: 13/289,322

(22) Filed: Nov. 4, 2011

(65) Prior Publication Data
US 2013/0111915 A1 May 9, 2013

(51) Int. Cl.
G01H 1/00 (2006.01)
F01D 17/02 (2006.01)
F02K 3/06 (2006.01)
G01H 1/04 (2006.01)
F01D 21/00 (2006.01)
F02C 9/28 (2006.01)

(52) U.S. Cl.
CPC *F02K 3/06* (2013.01); *G01H 1/006* (2013.01); *G01H 1/04* (2013.01); *F01D 21/003* (2013.01); *F02C 9/28* (2013.01); *F01D 17/02* (2013.01)

(58) Field of Classification Search
CPC .......... F02K 3/06; G01H 1/003; G01H 1/006; G01H 1/04; G01H 1/06; G01H 1/08; G01H 1/10; G01H 1/00; G01M 7/00; G01B 5/30; F01D 21/003; F01D 17/02; F01D 17/06; F01D 21/00; F01D 21/02; F02D 41/22; F02C 9/26; F02C 9/28; F04D 27/02; F04D 27/001
USPC ............. 60/773, 204, 233, 226.1, 262, 226.3, 60/771, 793, 39.24, 794; 73/660, 662, 73/787; 415/1, 118, 13; 701/99, 100; 702/81
See application file for complete search history.

(56) References Cited

U.S. PATENT DOCUMENTS

| | | | |
|---|---|---|---|
| 5,511,426 A * | 4/1996 | Clement et al. ................ 73/655 |
| 5,622,045 A | 4/1997 | Weimer et al. |
| 6,195,982 B1 * | 3/2001 | Gysling et al. ................ 60/204 |
| 6,286,361 B1 * | 9/2001 | Jones et al. ................ 73/24.05 |
| 6,499,350 B1 | 12/2002 | Board et al. |
| 6,582,183 B2 * | 6/2003 | Eveker et al. .................... 415/1 |
| 6,659,712 B2 | 12/2003 | Brooks et al. |
| 6,785,635 B2 * | 8/2004 | von Flotow ................... 702/184 |
| 6,932,560 B2 * | 8/2005 | Brooks ............................. 415/1 |
| 7,824,147 B2 | 11/2010 | Morris et al. |
| 7,836,772 B2 * | 11/2010 | Twerdochlib .................. 73/661 |
| 7,896,613 B2 | 3/2011 | Xiong |
| 8,126,662 B2 * | 2/2012 | Twerdochlib ................... 702/56 |
| 8,511,177 B1 * | 8/2013 | Makaremi ....................... 73/847 |
| 8,606,541 B2 * | 12/2013 | Platt et al. ..................... 702/170 |

(Continued)

*Primary Examiner* — William H Rodriguez
(74) *Attorney, Agent, or Firm* — Carlson, Gaskey & Olds, PC

(57) ABSTRACT

An aircraft jet engine system includes at least one gas turbine engine having a fan including a rotor and a plurality of fan blades. A sensor system in the fan section senses information about the operation of the blades and provides feedback on the condition of each blade to a control. The control is programmed to take in the sensed information and identify a safe operating range for the gas turbine engine based upon damage information developed from the sensed information with regard to each of the blades. An aircraft jet engine system incorporating a plurality of gas turbine engines wherein safe operating ranges are developed for each of the gas turbine engines is also disclosed as is a method of operating an aircraft jet engine system.

15 Claims, 7 Drawing Sheets

(56) References Cited

U.S. PATENT DOCUMENTS

| | | |
|---|---|---|
| 2003/0060986 A1* | 3/2003 | Flotow .............................. 702/36 |
| 2007/0043497 A1* | 2/2007 | Leogrande et al. ........... 701/100 |
| 2007/0245708 A1 | 10/2007 | Southwick |
| 2007/0250245 A1 | 10/2007 | van der Merwe |
| 2007/0271023 A1* | 11/2007 | Morris et al. ................. 701/100 |
| 2008/0149049 A1* | 6/2008 | Mollmann et al. ................ 123/2 |
| 2009/0162191 A1* | 6/2009 | Kang et al. .................... 415/118 |
| 2009/0177363 A1* | 7/2009 | Kulczyk et al. ............... 701/100 |
| 2009/0301055 A1* | 12/2009 | Kallappa .................... 60/39.091 |
| 2010/0076703 A1* | 3/2010 | Twerdochlib ................... 702/56 |
| 2012/0141248 A1* | 6/2012 | Rhoden ............................ 415/1 |
| 2013/0006541 A1* | 1/2013 | Kominsky ....................... 702/34 |
| 2013/0115050 A1* | 5/2013 | Twerdochlib ................ 415/118 |
| 2014/0003905 A1* | 1/2014 | Delvaux ............................ 415/1 |

* cited by examiner

CORRECTED FLOW

FLOW; THRUST RANGE

SYSTEM FOR OPTIMIZING POWER USAGE FROM DAMAGED FAN BLADES

BACKGROUND OF THE INVENTION

This application relates to a system which monitors damage to fan blades in a gas turbine engine, and reduces the power of the associated engines to increase the chance of survivability of an engine that has a damaged fan blade.

Aircraft gas turbine engines have a fan at a forward edge supplying air into a compressor section. The air is compressed and delivered downstream to a combustion section. In the combustion section, the air is mixed with fuel and burned. Products of the combustion pass downstream over turbine rotors, driving them to rotate.

The fan, being at the forward end of the engine, is subject to the ingestion of foreign objects. Recently, there have been high profile cases wherein large birds have been ingested into the fan section of a gas turbine engine on an aircraft. In one instance, both engines of a large jetliner were damaged to the point of failure by large bird ingestion.

Regulations place specific requirements on the operability of the gas turbine engine, even after ingestion of small to medium sized birds currently up to 2½ pounds (1.1 kg). However, these regulations have not required operability with larger birds of greater than 2½ pounds (1.1 kg); the only requirements for larger birds are that for birds up to 8 pounds, engine parts are not to pose a hazard to the aircraft after the bird is ingested.

One factor impacting on the design of gas turbine engines is a desire to increase fuel economy by decreasing weight. One way the designers of gas turbine engines have sought to reduce weight is to replace heavier, solid fan blades with hollow fan blades, hollow fan blades with titanium leading edges and solid composite blades. Maintaining survivability with such light weight fan blades is challenging, however.

In addition, there has been recent development of a gear train driven fan for gas turbine engines. This development will allow an increase in the diameter of the fan blades. Such an increase would increase the envelope exposed to ingestion in comparison to earlier engines at the same thrust.

Various monitoring systems for aircraft engines are known, and have provided some feedback to a pilot of damage to a particular engine. Engine rotor speeds, engine vibration and engine exhaust pressure are typically available but these provide only vague input regarding the damage to the fan rotor. Accordingly, in the past, there has been instances where pilots shut off the wrong engine based upon such vague feedback.

SUMMARY OF THE INVENTION

An embodiment addresses an aircraft jet engine system comprising at least one gas turbine engine having a fan delivering air into a compressor. The fan includes a rotor and a plurality of fan blades. A sensor system in the fan senses information about the operation of the blades and provides feedback on the condition of each blade to a control. The control is programmed to take in the sensed information and identify a safe operating range for the gas turbine engine based upon damage information developed from the sensed information with regard to each of the blades.

In a further embodiment, the system includes a plurality of gas turbine engines, and the safe operating range is determined for each of the gas turbine engines based upon damage information.

In a further embodiment of the foregoing system, the control operates automatically to reduce a power provided by one or more of the gas turbine engines, as appropriate, to keep each operating in their respective safe operating range.

In a further embodiment of the foregoing systems the control provides instruction to a pilot for the aircraft to reduce the power load for one or more of the gas turbine engines, as appropriate, based upon the damage information.

In a further embodiment of the foregoing systems, flutter is detected for each of the blades in the fan sections of each of the gas turbine engines, and the magnitude of flutter is utilized to identify the safe operating range.

In a further embodiment of the foregoing systems, sensors sense the arrival time of at least one of a trailing edge and a leading edge of each blade in each fan to develop the damage information.

In a further embodiment of the foregoing systems, sensors detect an angle of each blade based upon sensing the arrival of a trailing edge and a leading edge and utilize the angle to identify the magnitude of damage to a blade to in turn identify the safe operating range for an associated gas turbine engine.

In a further embodiment of the foregoing systems, the control monitors operation of the fan blade even when there is no damage and identifies a nominal position of each of the fan blades such that manufacturing tolerances are not identified as damage to the fan blade and such that monitored condition of the blades may be compared to prior stored conditions to identify when damage has occurred.

Another embodiment addresses a method of operating a jet engine system including the steps of sensing information on the operation of blades in each of the fan blades identified with a plurality of gas turbine engines and providing feedback on the condition of the fans of each of the gas turbine engines to a control. The control takes sensed information and identifies a safe operating range for each of the gas turbine engines based upon damage information developed from the sensed information with regard to each of the blades.

In a further embodiment of the foregoing method, the control operates automatically to reduce a power provided by one or more of the gas turbine engines, as appropriate, to keep them operating in their safe operating range.

In a further embodiment of the foregoing method, the control provides instruction to a pilot for the aircraft to reduce the power load for one or more of the gas turbine engines, as appropriate, based upon the damage information.

In a further embodiment of the foregoing method, flutter is detected for each of the blades in the fan sections of each of the gas turbine engines and the magnitude of flutter is utilized to identify the safe operating range.

In a further embodiment of the foregoing method, sensors sense the arrival time of at least one of a trailing edge and a leading edge of each blade in each fan section to develop damage information.

In a further embodiment of the foregoing method, sensors detect an angle of each blade based upon sensing the arrival of a trailing edge and a leading edge and utilize that angle to identify the magnitude of damage to each blade, to in turn identify the safe operating range for an associated gas turbine engine.

In a further embodiment of the foregoing method, the control monitors operation of the fan blade even when there is no damage and identifies a nominal position of each of the fan blades such that manufacturing tolerances are not identified as damage to the blade. The method further compares monitored conditions of the fan blade to prior stored conditions to identify when damage has occurred.

These and other features of the invention would be better understood from the following specifications and drawings, the following of which is a brief description.

DETAILED DESCRIPTION

An intent of this application is to expand the useful safe operation of multiple engine aircraft with damage to multiple engines beyond the current minimum regulatory requirements, or, beyond the capabilities of engines even if they well exceed minimum requirements.

Figure 1A:
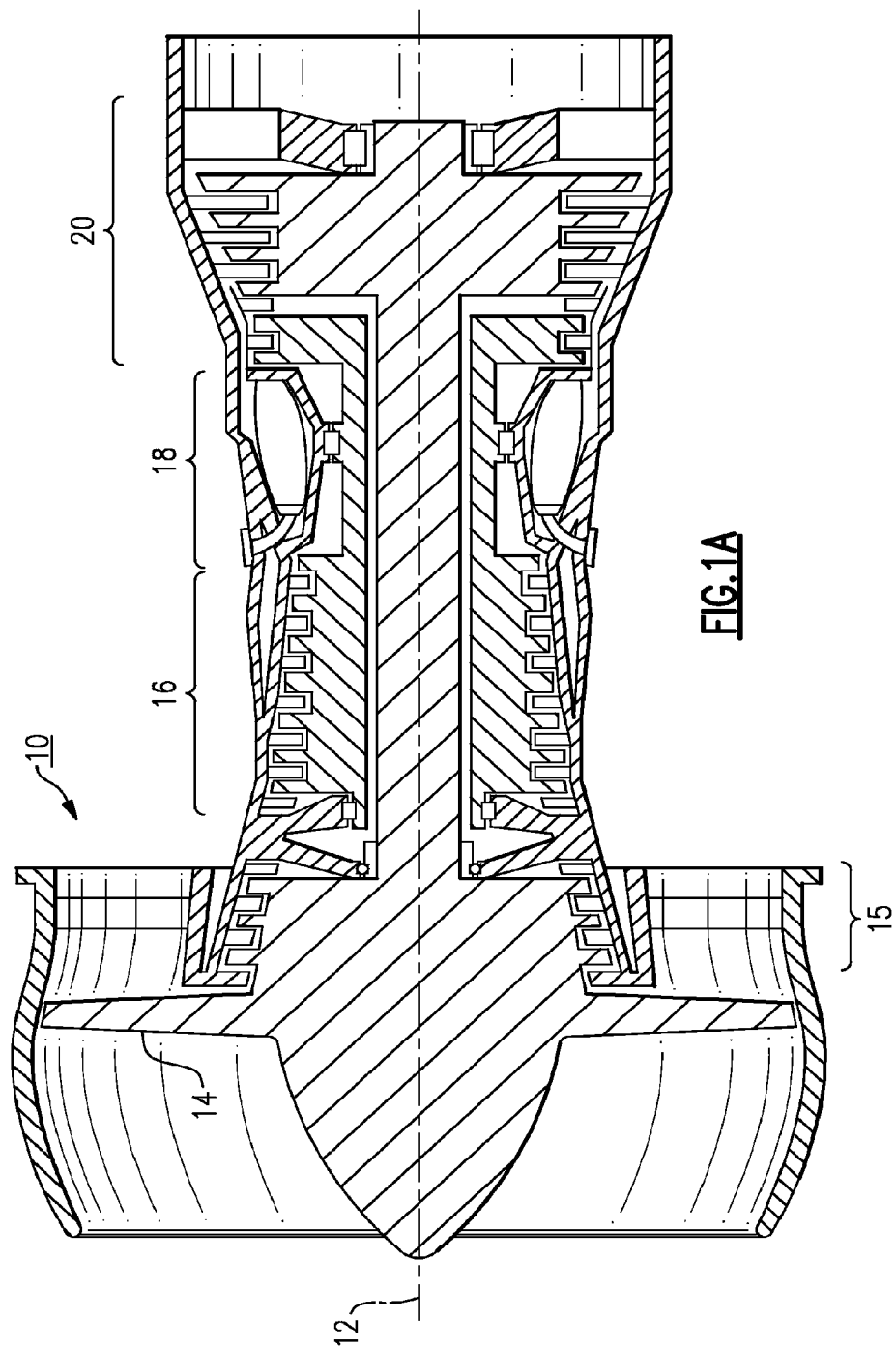
FIG. 1A schematically shows a gas turbine engine.

A gas turbine engine 10, such as a turbofan gas turbine engine, circumferentially disposed about an engine centerline 12, is shown in FIG. 1A. The engine 10 includes a fan 14, a compressor 15/16, a combustion section 18 and turbine sections 20. As is well known in the art, air compressed in the compressor 15/16 is mixed with fuel which is burned in the combustion section 18 and expanded across turbine sections 20. The turbine sections 20 include rotors that rotate in response to the expansion, driving the compressor 15/16 and fan 14. This structure is shown somewhat schematically in FIG. 1A. While one example gas turbine engine is illustrated, it should be understood this invention extends to any other type gas turbine engine for any application.

Figure 1B:
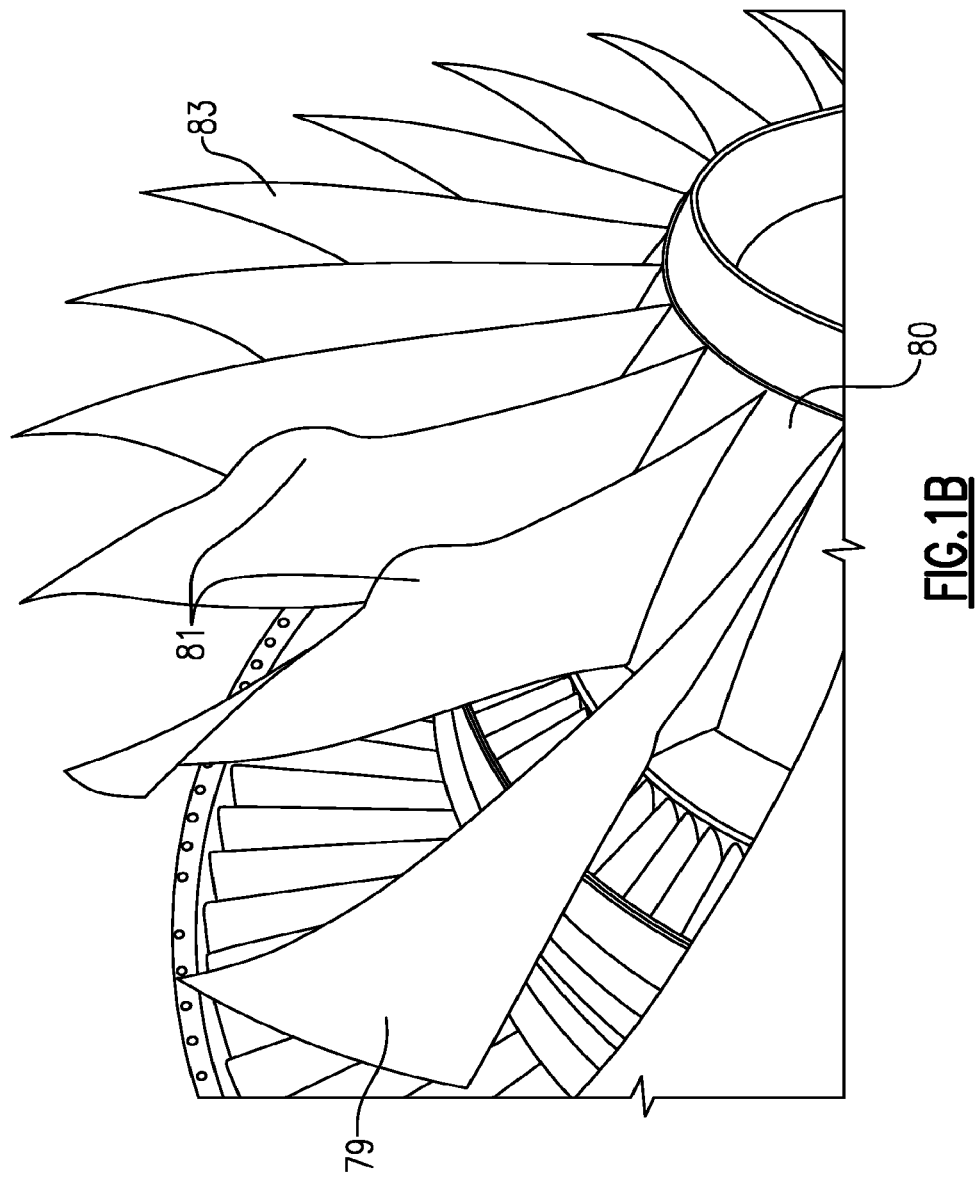
FIG. 1B schematically shows damaged fan blades.

FIG. 1B shows a damaged fan section 80, such as may occur due to ingestion of a bird. As shown, some blades 83 are not damaged by an impact. Blades 81 have some damage, and blade 79 is severely damaged. Applicant has identified that the ultimate cause of a failure of the engines for a modern jet aircraft that has been impacted by a bird hitting the fan section is well after the bird impact, and due to flutter experienced by the damaged fan blade as the jet engine continues to operate across its normal speed range.

Figure 2A:
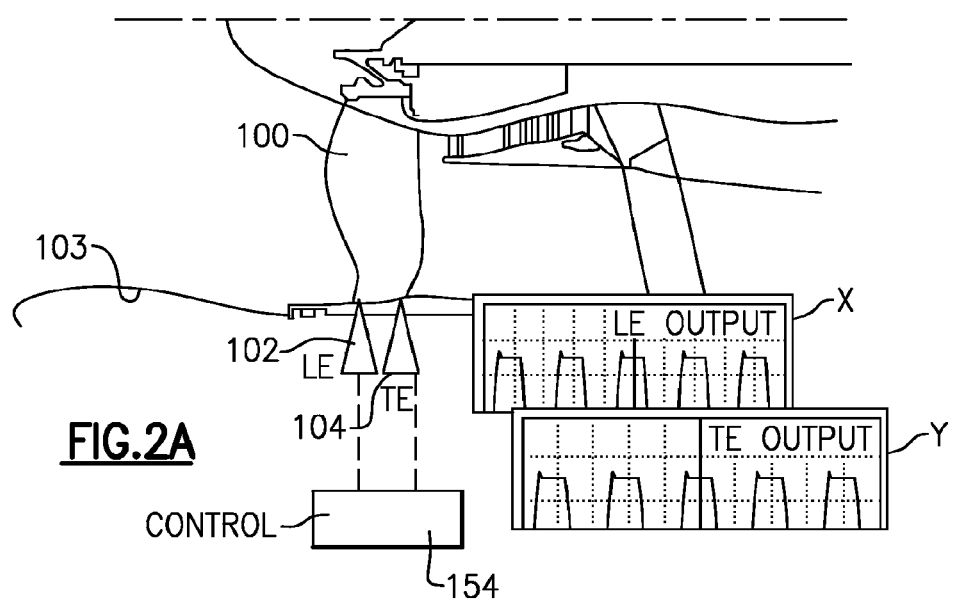
FIG. 2A shows an exemplary arrangement for monitoring the operation of fan blades.

FIG. 2A shows a system incorporated into a gas turbine engine to monitor each of the several fan blades 100. As shown, a sensor 102 at the leading edge and/or at the trailing edge 104 is mounted in a housing 103. Those sensors identify the time at which the leading edge and/or trailing edge of each fan blade 100 passes.

The system may monitor time of arrival of the leading and/or trailing edge to the sensors 102/104, the angle of arrival, or any other feature that allows identification of flutter. Sample outputs are shown at X and Y in this Figure.

Figure 2B:
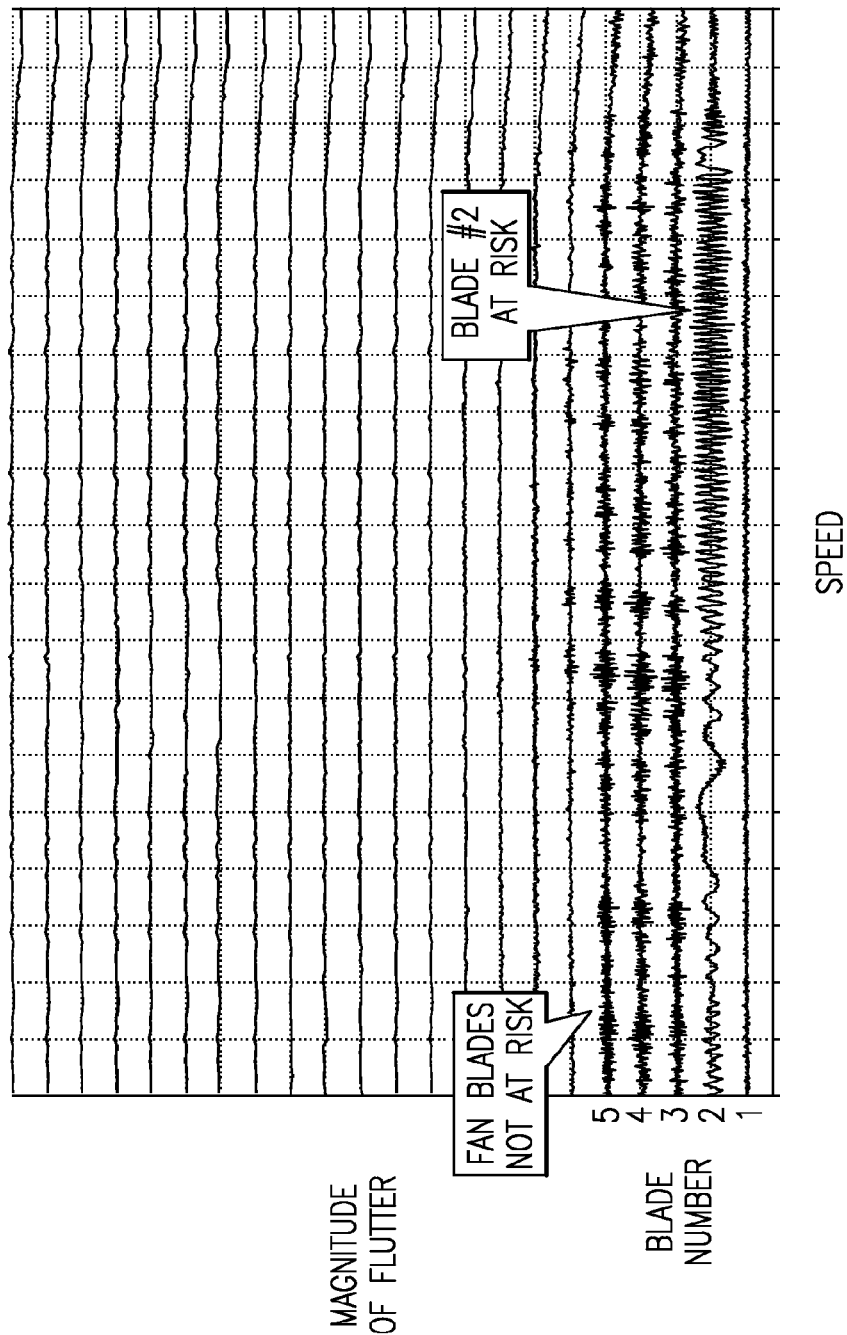
FIG. 2B shows exemplary flutter of blade number 2 and its neighboring blades as speed is increased across a speed range for the monitored fan blades.

FIG. 2B shows a magnitude of flutter across a speed range for a plurality of fan blades. As shown, a number of fan blades are not at risk. However, the fan blade identified as number 2 has risk as the speed increases. As is clear, the magnitude of its flutter increases dramatically as the speed increases compared to the non-damaged blades. This invention identifies that it may be best to operate an engine having such a fan blade at the lower speed ranges once this magnitude of flutter has been identified.

Figure 3:
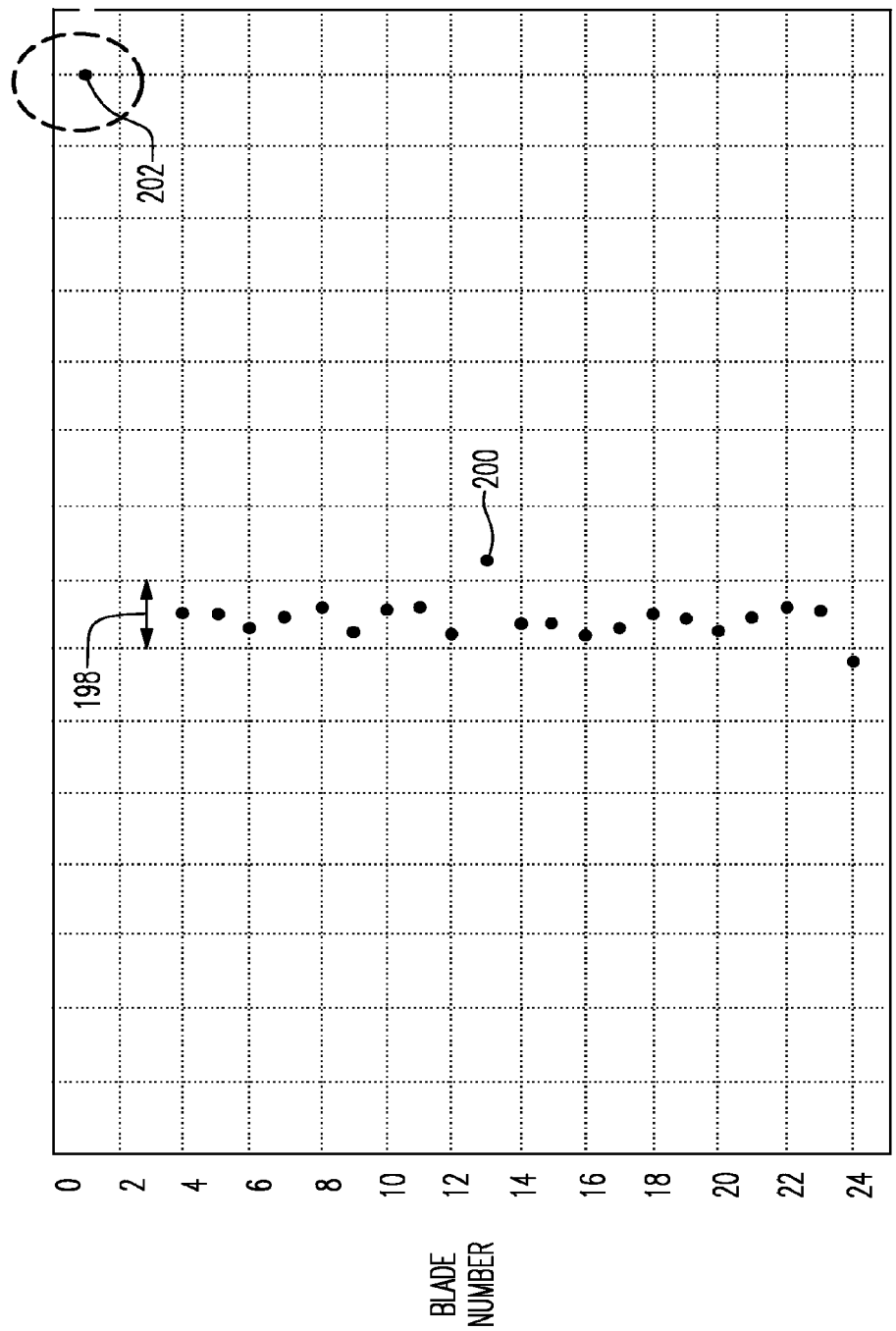
FIG. 3 shows a magnitude of flutter for an exemplary damaged blade at one speed.

FIG. 3 shows operational data. The time of arrival of a plurality of blades is shown at one speed. The bulk of the blades are within a narrow band 198. While in an ideal situation, the arrival times of the blades should all be within this very tight band, one shown at 200 is outside the band 198. This may occur due to manufacturing tolerances. Normal indexing by a control for the system will recognize that the distance 200 is a "safe" distance for the particular fan blade because its normal history of mis-timed arrival relative to its neighbors.

On the other hand, a data point 202 is shown that is far outside the band 198 and the blade has no history of arriving in such a distorted manner. The control for the system will be able to identify this as severely damaged blade, by first recognizing that it is a change from the previous position of that blade, but also due to the magnitude of the position.

The control monitors operation of the fan blade even when there is no damage, and identifies a nominal position of each of the fan blades such that manufacturing tolerances (e.g., point 200), or other positioning discrepancies are not identified as damage to the fan blade, and rather, monitored conditions of the fan blade may be compared to prior stored conditions to identify when damage has occurred (e.g., at point 202).

When an object has struck the fan section, such that the blades are damaged as in FIG. 1B, the system will identify the problem due to the resultant flutter as shown in FIGS. 2B and 3.

Figure 4A:
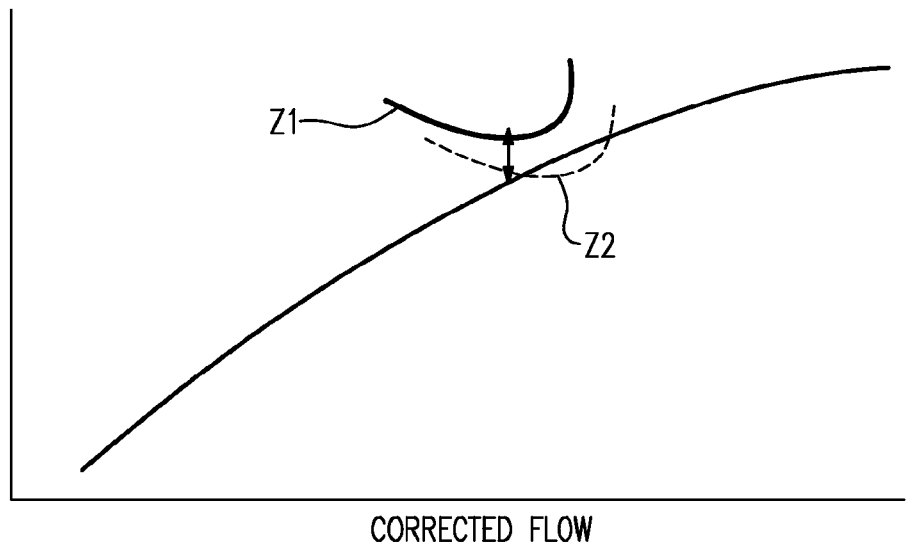
FIG. 4A shows a flutter region with regard to the operation of a damaged fan blade and an undamaged fan blade.

FIG. 4A shows a feature that is recognized by the present invention to control the operation of an engine that has a damaged fan blade. As shown, a region $Z_1$ is typically above a normal operational range for the gas turbine engine. This is a region of aero-elastic instability of the fan blade without damage. This region would be one in which operation of the fan would result in instability, and potential breaking or other failure of a fan blade. Of course, the engine design avoids this region across its operational range.

However, after damage, such as by a bird strike, that region has now moved downwardly to the region $Z_2$. In such a situation it would be highly undesirable to operate the gas turbine engine and this fan at the speed range which crosses through this region. Fan flutter can result in breaking of the fan blade, which could then result in failure of the engine.

Figure 4B:
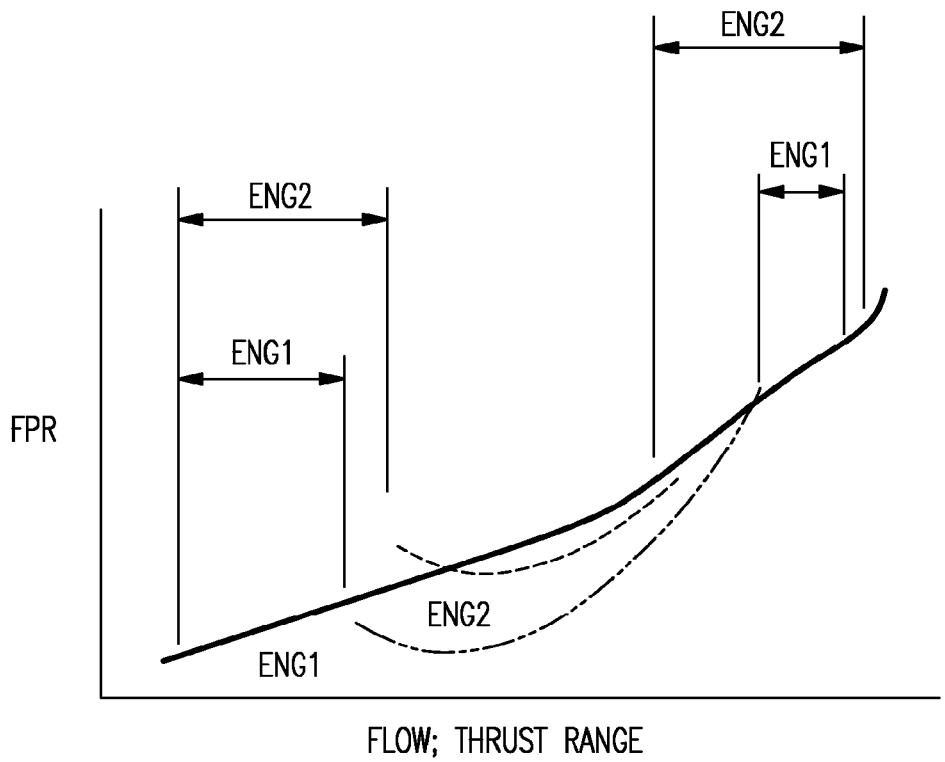
FIG. 4B shows a composite of the FIG. 4A for two damaged engines with Engine 2 having a different magnitude of damage than Engine 1.

FIG. 4B shows an extreme situation where both engines incorporate fan blades which have been damaged. The totality of fan blades across the engine are utilized to calculate these regions. Thus, the control would know that the engine 1 must be operated in the extreme small speed range to the left of its region, while the engine 2 should be operated in another small speed range (albeit larger than engine 1), also illustrated in this Figure.

While it is undesirable to have the lesser amount of power provided by engines operating at a small percentage of their speed range, it is far better than the alternative of experiencing an engine failure should the engine continue to operate in a speed range which could result in complete failure. Even with its much reduced power, the engine still provides hydraulic power, electrical power and most importantly, some thrust and reduced drag relative to an engine that is shut down.

Figure 5:
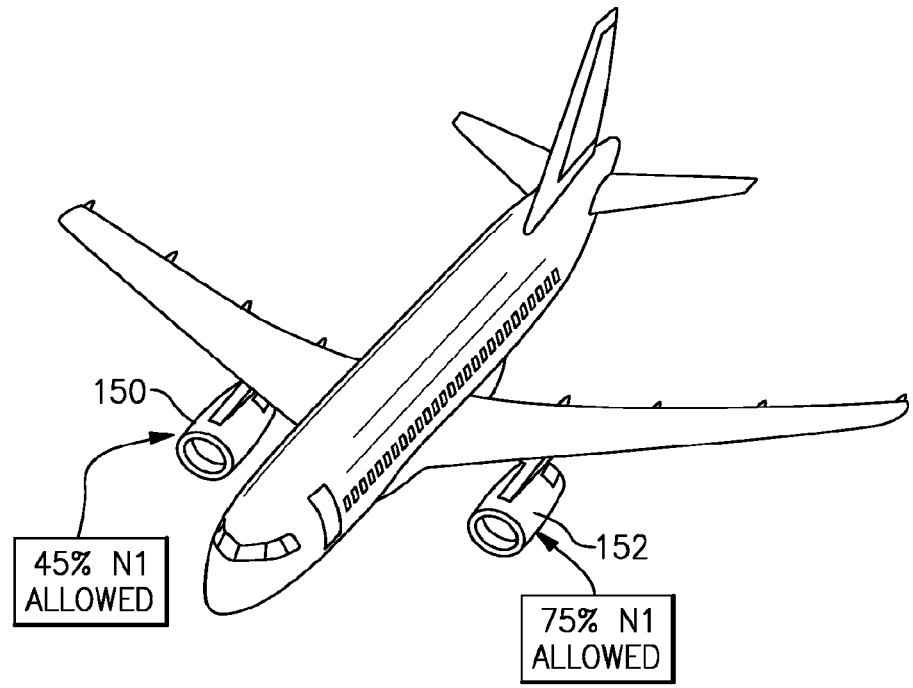
FIG. 5 schematically shows an operational result for a subject jet aircraft.

Thus, as shown in FIG. 5, one engine 150 may be operated at 45% of normal power, while the engine 152 may be operated at 75% of the power. Of course, most damage situations would involve only one engine operating at reduced power. FIG. 5 illustrate an extreme condition.

The amount of flutter correlated to the speed range, or regions of aero-elastic instability, can be determined experimentally, or by computer simulation. Avoiding the regions of aero-elastic instability, given the amount of damage to the fan blade, thus allows a control for the aircraft to maximize the amount of available power, and to preserve operation of its engines even after a large bird strike, or other damage.

Notably, while there has been a good deal of emphasis on bird strikes, this application will also identify more routine, progressive fatigue cracking of a fan blade. This would allow for routine maintenance to prevent expensive damage to a fan module.

Figure 6:
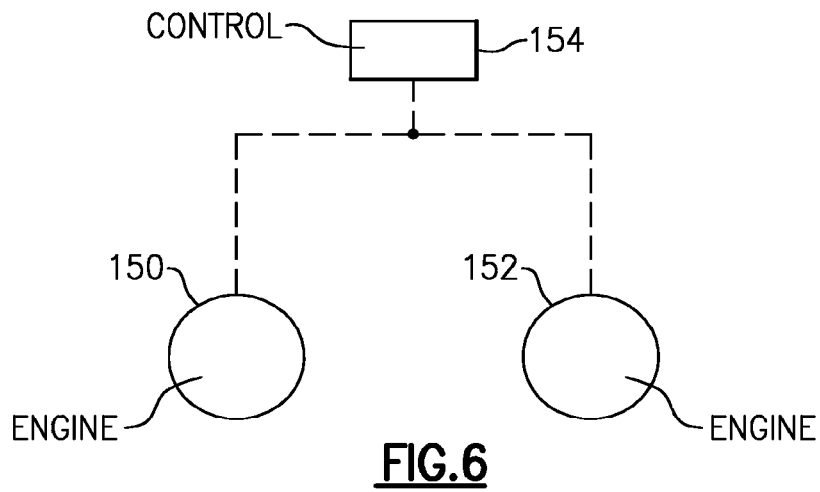
FIG. 6 shows one control scenario.

FIG. 6 shows a first control scenario wherein a control 154 receives the fan blade information, and controls the throttle power to the engines 150 and 152 to be within the desired regions. Thus, the FADEC, or main control 154 for the engine automatically operates the two engines.

Figure 7:
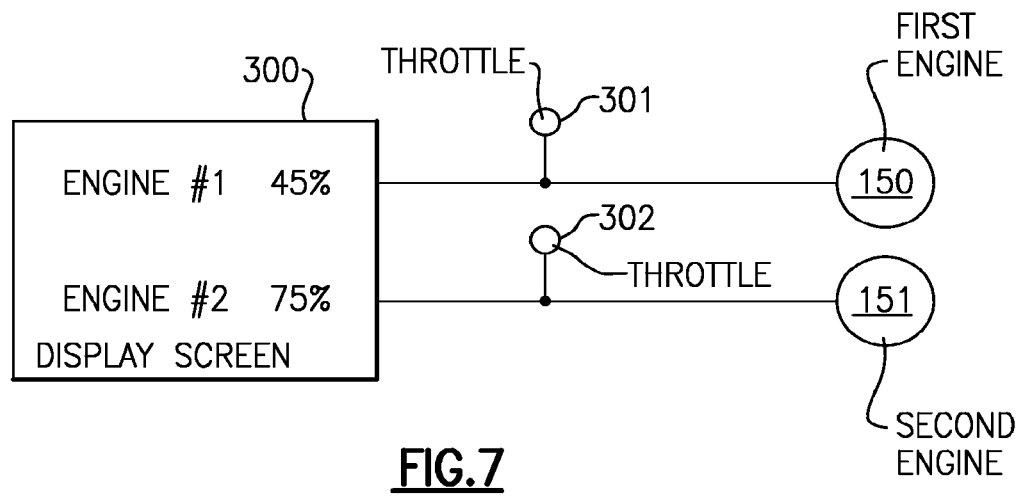
FIG. 7 shows another control scenario.

FIG. 7 shows an alternative embodiment wherein a pilot is provided with instruction to reduce the power on a display screen 300, and then instructed to reduce the throttle 301 associated with the first engine 150 and to reduce the throttle 302 associated with the second engine 151.

Either embodiment maximizes the amount of available power from the overall aircraft after a catastrophic ingestion of a foreign object into the fan.

The controls of FIGS. 6 and 7 will ensure that the proper engines are reduced to their reduced operational points, and will reduce or eliminate the potential for pilot error between the two engines. Of course, while only two engines are shown, some aircraft have additional engines, and the teachings of this application would extend to those aircraft. In addition, the teachings would extend to aircraft employing a single gas turbine engine.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An aircraft jet engine system comprising:
at least one gas turbine engine, said gas turbine engine having a fan delivering air into a compressor, the fan including a rotor and a plurality of fan blades;
a sensor system in the fan section for sensing information about the operation of the blades, and providing feedback on the condition of each said blade to a control;
said control being programmed to take in the sensed information and identify a safe operating range for the gas turbine engine based upon damage information developed from the sensed information with regard to each of the blades;
the sensor sensing a time in which a portion of each fan blade passes, as sensed information to be provided as said feedback; and
the safe operating range including a range of speed.

2. An aircraft jet engine system comprising:
a plurality of gas turbine engines, each having a fan delivering air into a compressor, the compressor delivering compressed air into a combustion section, and the combustion section delivering products of combustion across a turbine section;
a sensor system in each of the fan sections for sensing information about the operation of fan blades, and providing feedback on the condition of the blades in each of the gas turbine engines to a control;
said control being programmed to take in the sensed information, and identify a safe operating range for each of the gas turbine engines based upon damage information developed from the sensed information with regard to each of the blades;
the sensor sensing a time in which a portion of each fan blade passes, as sensed information to be provided as said feedback; and
the safe operating range including a range of speed.

3. The system set forth in claim 2, wherein said control operates automatically to reduce a power provided by one or more of the gas turbine engines, as appropriate, to keep each operating in their respective safe operating range.

4. The system as set forth in claim 2, wherein said control provides instruction to a pilot for the aircraft to reduce the power load for one or more of the gas turbine engines as appropriate based upon the damage information of the blades.

5. The system as set forth in claim 2, wherein any flutter is detected for each of the blades in the fan sections of each of the gas turbine engines, and the magnitude of flutter is utilized to identify the safe operating range.

6. The system as set forth in claim 2, wherein sensors sense the arrival time of at least one of a trailing edge and a leading edge of each said blade in each said fan section to develop the damage information.

7. The system as set forth in claim 6, wherein sensors detect an angle of each blade based upon sensing the arrival of a trailing edge and a leading edge, and utilize that angle to identify the magnitude of damage to a blade, to in turn identify the safe operating range for an associated gas turbine engine.

8. The system as set forth in claim 2, wherein the control monitors operation of the fan blade even when there is no damage, and identifies a nominal position of each of the fan blades such that manufacturing tolerances are not identified as damage to the fan blade, and such that monitored conditions of the blades may be compared to prior stored conditions to identify when damage has occurred.

9. A method of operating a jet engine system including the steps of:
sensing information on the operation of blades in each of the fan sections identified with a plurality of gas turbine engines, and providing feedback on the condition of the fan sections of each of the gas turbine engines to a control;
the control taking the sensed information and identifying a safe operating range for each of the gas turbine engines based upon damage information developed from the sensed information with regard to each of the blades;
the sensor sensing a time in which a portion of each fan blade passes, as sensed information to be provided as said feedback; and
the safe operating range including a range of speed.

10. The method set forth in claim 9, wherein said control operates automatically to reduce a power provided by one or more of the gas turbine engines, as appropriate, to keep them operating in their safe operating range.

11. The method as set forth in claim 9, wherein said control provides instruction to a pilot for the aircraft to reduce the power load for one or more of the gas turbine engines, as appropriate, based upon the damage information.

12. The method as set forth in claim 9, wherein flutter is detected for each of the blades in the fan sections of each of the gas turbine engines, and the magnitude of flutter is utilized to identify a safe operating range.

13. The method as set forth in claim 9, wherein sensors sense the arrival time of at least one of a trailing edge and a leading edge of each said blade in each said fan section to develop the damage information.

14. The method as set forth in claim 13, wherein sensors detect an angle of each said blade based upon sensing the arrival of a trailing edge and a leading edge, and utilize that angle to identify the magnitude of damage to each blade, to in turn identify the safe operating range for an associated gas turbine engine.

15. The method as set forth in claim 9, wherein the control monitors operation of the fan blade even when there is no damage, and identifies a nominal position of each of the fan blades such that manufacturing tolerances are not identified as damage to the fan blade, and monitored conditions of the fan blade being compared to prior stored conditions to identify when damage has occurred.

* * * * *